United States Patent
Iwamoto et al.

(10) Patent No.: US 8,891,879 B2
(45) Date of Patent: Nov. 18, 2014

(54) IMAGE PROCESSING APPARATUS, IMAGE PROCESSING METHOD, AND PROGRAM

(75) Inventors: Takayuki Iwamoto, Kawasaki (JP); Kenji Tsukamoto, Kawasaki (JP); Yasuo Katano, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 618 days.

(21) Appl. No.: 12/857,804

(22) Filed: Aug. 17, 2010

(65) Prior Publication Data

US 2011/0052071 A1 Mar. 3, 2011

(30) Foreign Application Priority Data

Sep. 3, 2009 (JP) ................................. 2009-204137

(51) Int. Cl.
*G06K 9/48* (2006.01)
*G06T 7/00* (2006.01)

(52) U.S. Cl.
CPC ..... *G06T 7/0083* (2013.01); *G06T 2207/10024* (2013.01)
USPC ............ 382/199; 382/173; 382/203; 382/205

(58) Field of Classification Search
USPC .................. 382/199, 201, 203–205, 173–180
See application file for complete search history.

(56) References Cited

U.S. PATENT DOCUMENTS

| | | | | |
|---|---|---|---|---|
| 5,119,439 A * | 6/1992 | Osawa et al. | ................... | 382/199 |
| 5,396,584 A * | 3/1995 | Lee et al. | ....................... | 345/589 |
| 5,586,199 A * | 12/1996 | Kanda et al. | ................... | 382/197 |
| 5,668,893 A * | 9/1997 | Kanda et al. | ................... | 382/197 |
| 5,680,471 A * | 10/1997 | Kanebako et al. | ............ | 382/128 |
| 5,732,149 A * | 3/1998 | Kido et al. | ..................... | 382/128 |
| 5,751,831 A * | 5/1998 | Ono | .............................. | 382/103 |
| 5,754,180 A * | 5/1998 | Kivolowitz et al. | ........... | 345/418 |
| 5,870,494 A * | 2/1999 | Kanda et al. | ................... | 382/197 |
| 5,881,170 A * | 3/1999 | Araki et al. | .................... | 382/199 |
| 5,887,082 A * | 3/1999 | Mitsunaga et al. | ........... | 382/199 |

(Continued)

FOREIGN PATENT DOCUMENTS

| | | |
|---|---|---|
| JP | H05-324830 | 12/1993 |
| JP | H08-016793 | 1/1996 |

OTHER PUBLICATIONS

K. Mikolajczyk et al., "Scale and Affine Invariant Interest Point Detectors", *Intl. Jour. of Computer Vision*, vol. 60, No. 1, pp. 63-86 (2004).

(Continued)

*Primary Examiner* — Aaron W Carter
(74) *Attorney, Agent, or Firm* — Fitzpatrick, Cella, Harper & Scinto (57) ABSTRACT

An image processing apparatus for extracting a contour of an object which extracts boundary candidate points from the image and sets reference areas each having one of boundary candidate points as a center and includes small areas. A first reference area is set from the reference areas and a first small area is set from small areas included in the first reference area. From reference areas, a second reference area is set, whose feature is similar to that of the first reference area and as a second small area, a small area is set which has a feature amount similar to that of the first small area among small areas included in the second reference area. The boundary candidate points is tracked to extract the contour of the object based on the first reference area, the second reference area, the first small area, and the second small area.

12 Claims, 6 Drawing Sheets

(56) References Cited

U.S. PATENT DOCUMENTS

| | | | |
|---|---|---|---|
| 5,896,466 A * | 4/1999 | Kim | 382/242 |
| 5,920,356 A * | 7/1999 | Gupta et al. | 348/606 |
| 5,982,386 A * | 11/1999 | Fujimoto | 345/443 |
| 6,031,935 A * | 2/2000 | Kimmel | 382/173 |
| 6,178,264 B1 * | 1/2001 | Kamatani | 382/199 |
| 6,252,985 B1 * | 6/2001 | Mitsunaga et al. | 382/199 |
| 6,493,465 B2 * | 12/2002 | Mori et al. | 382/209 |
| 6,674,902 B1 * | 1/2004 | Kondo et al. | 382/199 |
| 6,687,392 B1 * | 2/2004 | Touzawa et al. | 382/128 |
| 6,728,404 B1 * | 4/2004 | Ono et al. | 382/190 |
| 6,757,444 B2 * | 6/2004 | Matsugu et al. | 382/283 |
| 6,924,836 B2 * | 8/2005 | Ohki | 348/208.6 |
| 6,980,237 B2 * | 12/2005 | Ohki | 348/208.6 |
| 7,076,099 B2 * | 7/2006 | Kondo et al. | 382/203 |
| 7,590,262 B2 * | 9/2009 | Fujimura et al. | 382/104 |
| 7,627,175 B2 * | 12/2009 | Le Clerc et al. | 382/173 |
| 7,636,455 B2 * | 12/2009 | Keaton et al. | 382/104 |
| 7,729,536 B2 * | 6/2010 | Eguchi et al. | 382/173 |
| 7,903,861 B2 * | 3/2011 | Luo et al. | 382/132 |
| 8,144,961 B2 * | 3/2012 | Lee et al. | 382/131 |
| 8,144,993 B2 * | 3/2012 | Nishimura et al. | 382/199 |
| 8,199,981 B2 * | 6/2012 | Koptenko et al. | 382/128 |
| 8,204,287 B2 * | 6/2012 | Inoue et al. | 382/128 |
| 8,223,402 B2 * | 7/2012 | Yao | 358/3.06 |
| 8,249,345 B2 * | 8/2012 | Wu et al. | 382/173 |
| 8,330,997 B2 * | 12/2012 | Quan | 358/474 |
| 8,422,788 B2 * | 4/2013 | Demandolx et al. | 382/190 |
| 2002/0172286 A1 * | 11/2002 | Ohki | 375/240.16 |
| 2004/0086184 A1 * | 5/2004 | Kondo et al. | 382/203 |
| 2005/0157941 A1 * | 7/2005 | Lim | 382/266 |
| 2005/0249430 A1 * | 11/2005 | Lim | 382/266 |
| 2007/0076965 A1 * | 4/2007 | Shimada | 382/239 |
| 2008/0008369 A1 * | 1/2008 | Koptenko et al. | 382/128 |
| 2008/0097209 A1 * | 4/2008 | Lee et al. | 600/443 |
| 2008/0292154 A1 * | 11/2008 | Nishimura et al. | 382/128 |
| 2009/0087024 A1 * | 4/2009 | Eaton et al. | 382/103 |
| 2009/0175537 A1 * | 7/2009 | Tribelhorn et al. | 382/173 |
| 2009/0208114 A1 * | 8/2009 | Tanaka et al. | 382/199 |
| 2009/0237406 A1 * | 9/2009 | Chen et al. | 345/441 |
| 2009/0316990 A1 * | 12/2009 | Nakamura et al. | 382/173 |
| 2009/0324078 A1 * | 12/2009 | Wu et al. | 382/173 |
| 2010/0046830 A1 * | 2/2010 | Wang et al. | 382/164 |
| 2010/0054595 A1 * | 3/2010 | Demandolx et al. | 382/170 |
| 2010/0054622 A1 * | 3/2010 | Adams | 382/269 |
| 2010/0080487 A1 * | 4/2010 | Yitzhaky et al. | 382/266 |
| 2010/0085611 A1 * | 4/2010 | Quan | 358/474 |
| 2010/0215271 A1 * | 8/2010 | Dariush et al. | 382/180 |
| 2010/0277770 A1 * | 11/2010 | Yao | 358/3.06 |
| 2013/0121606 A1 * | 5/2013 | Chien et al. | 382/260 |

OTHER PUBLICATIONS

T. Lindeberg, "Edge Detection and Ridge Detection with Automatic Scale Selection", *Intl. Jour. of Computer Vision*, vol. 30, No. 2, pp. 117-154 (1998).

* cited by examiner

IMAGE PROCESSING APPARATUS, IMAGE PROCESSING METHOD, AND PROGRAM

BACKGROUND OF THE INVENTION

1. Field of the Invention

The present invention relates to an image feature extraction method, and image processing using the image feature extraction method.

2. Description of the Related Art

A technique of extracting the contour of an object in an image by using image features near pixels as contour candidates is known. Japanese Patent Laid-Open No. 8-16793 discloses a technique in which when extracting an edge area, a threshold for identifying the edge area or other areas is changed based on the statistical feature amount of pixels within a predetermined mask area around a pixel of interest and the edge intensity of the pixel of interest. This allows an edge area to be reliably and efficiently identified as compared with a method to identify an edge area using a fixed threshold.

Japanese Patent Laid-Open No. 5-324830 discloses a contour tracking method. In this method, one pixel on the contour of an object in an image is considered as an initial point, and pixels within a predetermined range from that pixel are determined as contour candidate points. Based on image data indicating the colors of each contour candidate point and pixels around it, it is determined whether a corresponding contour candidate point serves as a point on the contour to track the contour.

In the above techniques, however, it is impossible to automatically determine an appropriate range or the area of a shape when setting a neighboring area of the pixel of interest.

In the technique disclosed in Japanese Patent Laid-Open No. 8-16793, a mask area is set for a specified point in an image. There is, however, left unsolved a problem of how to determine the shape and range of the mask area. If an image in an environment where the background is complex is to be processed, there is not only a boundary which divides an area into two parts but also a junction such as a T-junction. In this case, it is impossible to simply set an inner or outer area as a mask area, and it is necessary to set a mask area in consideration of the shape of the contour and a surrounding luminance gradient.

In the technique disclosed in Japanese Patent Laid-Open No. 5-324830, based on image data indicating the colors of each contour candidate point and pixels around it, whether the corresponding contour candidate point serves as a point on the contour is determined. It is, however, impossible to determine a range of pixels around each candidate point to be considered. If, for example, only neighboring pixels are considered to fall within the range, the influence of image noise is great. It is, therefore, necessary to set a neighboring area having an appropriate range, and to attempt to reduce the influence of noise by using a statistical amount such as the average value or histogram of pixel values in the area. At this time, if a large area relative to a degree of unevenness of the contour or an area having an inappropriate shape for the shape of the contour is set especially in the vicinity of a target contour, a pixel group belonging to the background may be included in an area which should essentially include only a pixel group belonging to the target contour. In this case, as described above, it is necessary to set a partial area in consideration of the shape of the contour and a surrounding luminance gradient.

As a method of setting a partial area in accordance with a surrounding luminance gradient, Harris-Affine Region Detector is well known. Harris-Affine Region Detector is described in Krystian Mikolajczyk and Cordelia Schmid, "Scale & Affine Invariant Interest Point Detectors, "International Journal of Computer Vision, 60(1), pp. 63-86, 2004.

This technique is used to associate, if there are two images which are obtained when the same scene or object is viewed from different angles, partial images with each other. When applying this technique to a method of extracting a contour by sequentially connecting the contours of objects, such as the contour tracking method, it is necessary to associate parts belonging to a target object in a partial image because of a nonuniform background in an actual image.

SUMMARY OF THE INVENTION

In the present invention, when extracting a contour, a reference area including small areas is set in accordance with the global shape of the contour within an appropriate range of a target object. This suitably sets image features which are used for determining a search range of contour candidate points and whether each contour candidate point is on the contour, and then stably extracts pixels around the contour without depending on the shape of the contour. That is, even if the contour includes a smooth curve and a curve with fine unevenness, the contour is correctly extracted.

One aspect of embodiments of the present invention relates to an image processing apparatus for extracting a contour of an object in an image, comprising an area setting unit configured to extract a plurality of boundary candidate points from the image, and setting reference areas each of which has one of the plurality of boundary candidate points as a center and includes a plurality of small areas, a first reference area setting unit configured to set a first reference area from the plurality of reference areas; a first small area setting unit configured to set a first small area from a plurality of small areas included in the first reference area, a second reference area setting unit configured to set, from the plurality of reference areas, a second reference area whose feature associated with the shape is similar to that of the first reference area, a second small area setting unit configured to set, as a second small area, a small area which has a feature amount similar to that of the first small area among a plurality of small areas included in the second reference area, a storage unit configured to store, in association with each other, the first reference area, the second reference area, the first small area, and the second small area, and a contour extraction unit configured to track the boundary candidate points to extract the contour of the object based on the information stored in the storage unit.

Further features of the present invention will become apparent from the following description of exemplary embodiments (with reference to the attached drawings).

DESCRIPTION OF THE EMBODIMENTS

An embodiment of the present invention will be described in detail below with reference to the accompanying drawings. An image processing apparatus according to the embodiment uses an image feature amount within a reference area including a plurality of small areas, which is set based on the global shape of a contour in an image, and groups pixels near the contour.

An example will be explained below using the accompanying drawings. In this embodiment, a case will be explained in which pixels near a boundary are evaluated based on image features using color information in a still image including a plurality of objects and the background. Although the image features according to the embodiment use color information, the present invention is not limited to this. It is also possible to use another image information including image information which is obtained from a still image and moving image, such as luminance values and motion vectors.

Figure 1A:
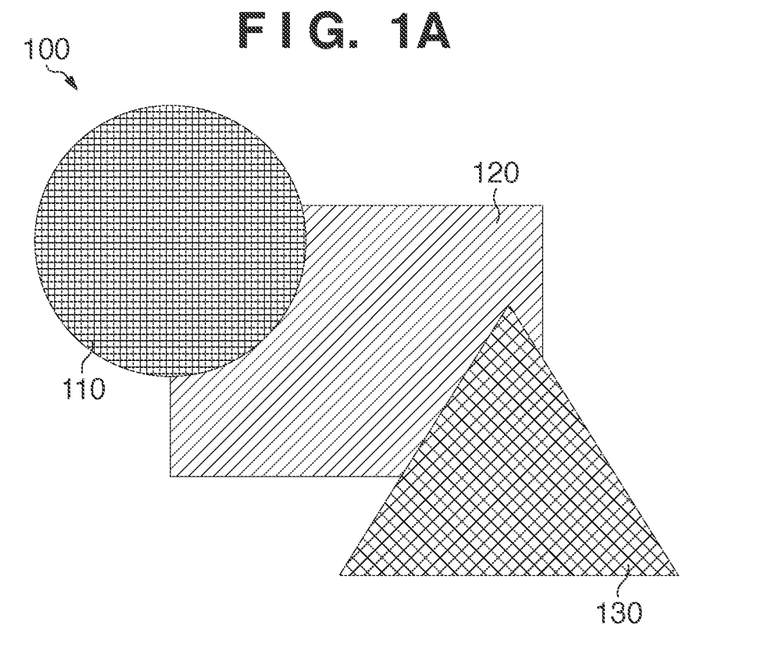
FIG. 1A is a view showing an example of an image to be processed in an embodiment.
Figure 1B:
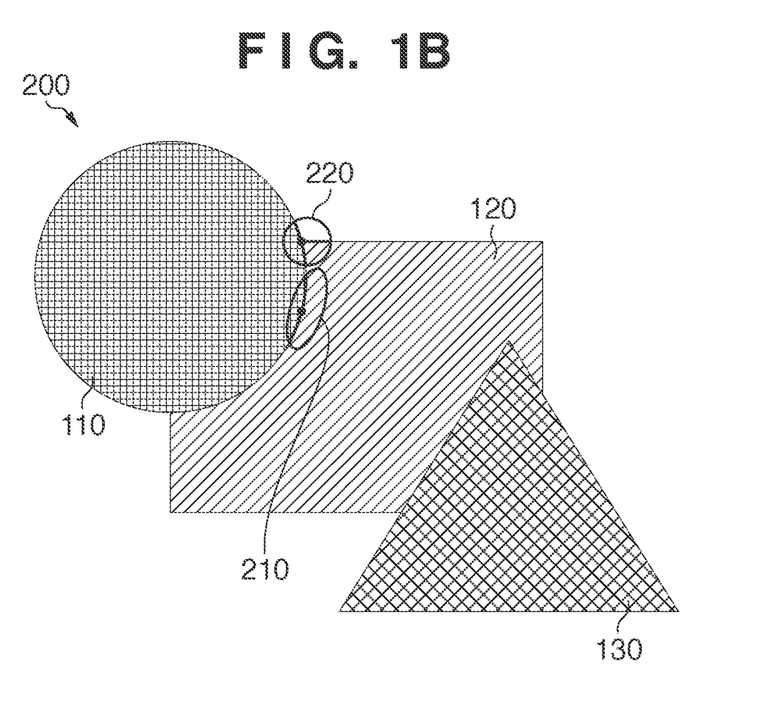
FIG. 1B shows an image in which reference areas are set with respect to boundary candidate points near the boundaries of the figures in the embodiment.

FIG. 1A shows an example of a target image of the present invention wherein a figure (circle) 110, figure (rectangle) 120, and figure (triangle) 130 serve as objects having different pieces of color information, and overlap each other. FIG. 1B shows an image in which reference areas are set with respect to boundary candidate points near the boundaries of the figures. A reference area 210 is set at a point near the boundary between the circle 110 and the rectangle 120. A reference area 220 is set at a point positioned near a T-junction. The "T-junction" indicates an area where the contours of the figures intersect each other. In the reference area 220, for example, the contour of the circle 110 and that of the rectangle 120 intersect each other.

Figure 2A:
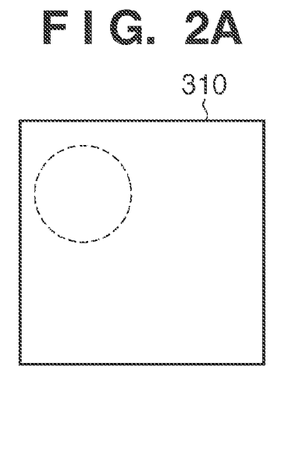
FIGS. 2A to 2C are views showing examples of contour extraction results in the embodiment.
Figure 2B:
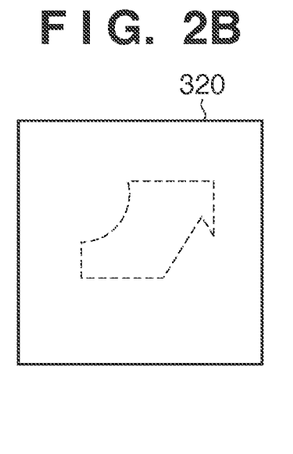
Figure 2C:
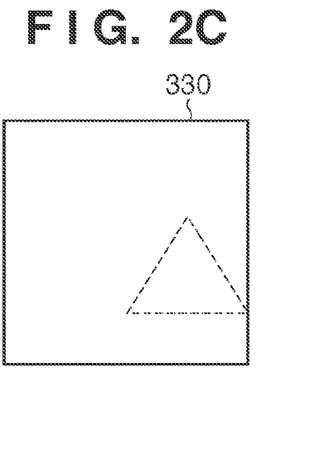

Each reference area is divided into small areas in accordance with surrounding color information. Among smaller areas included in the reference area 210 and those included in the reference area 220, small areas located on the same side are compared. If, as a result of comparison, their image feature amounts are similar to each other, the reference areas 210 and 220 are determined to belong to the same group based on the image features of the small areas used for comparison. By repeating the determination processing, the contours are grouped using color information and contour shape information held by each figure as shown in FIGS. 2A to 2C, thereby eventually obtaining images 310 and 330.

Figure 3:
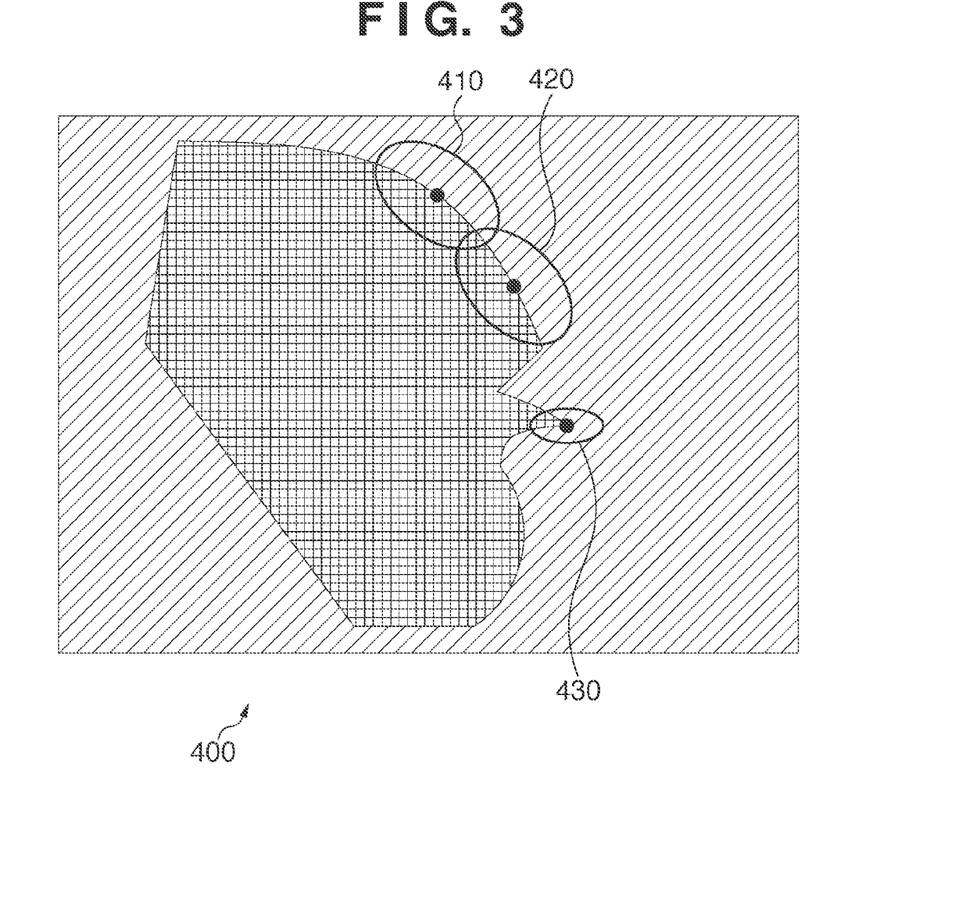
FIG. 3 is a view showing an example of the process of image processing in the embodiment.

In this embodiment, if the shape of the boundary is complex as shown in FIG. 3, it is possible to group pixels near the contour with reference to image information within an appropriate range by determining a range of interest and its shape based on the global shape of the contour. Each of reference areas 410 to 430 in FIG. 3 represents a reference area with a given boundary candidate point as the center, which is set by a method to be described later. If the reference areas 410 and 420 are compared with each other, they have similar sizes and shapes but different directions set along the contour. As compared with the reference area 410 or 420, the reference area 430 has been set with a size, shape and direction according to a degree of unevenness of a neighboring contour.

Figure 4:
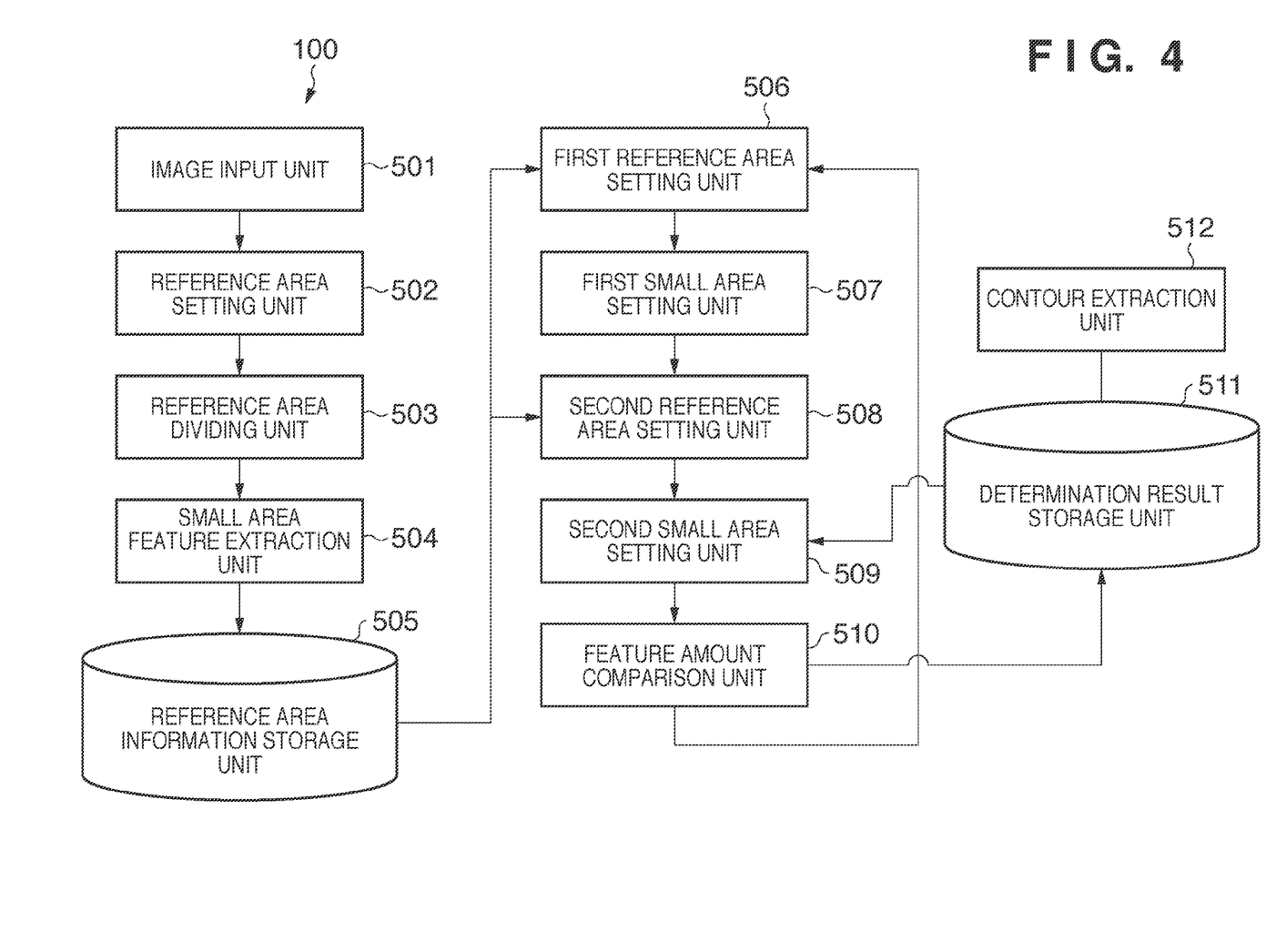
FIG. 4 is a functional block diagram showing an example of the arrangement of an image processing apparatus according to the embodiment.

FIG. 4 is a functional block diagram showing an image processing apparatus 100 according to the embodiment. Each block of the image processing apparatus 100 may be configured by a hardware component using a dedicated logic circuit or memory. Alternatively, when a computing device such as a CPU executes a processing program stored in a memory, each block may be configured by a software component.

An image input unit 501 may serve as an image capturing apparatus for capturing an object in real time to generate image data, or a storage for storing image data. An image input from the image input unit 501 is output to a reference area setting unit 502. The reference area setting unit 502 obtains a scale so that an image feature amount at a given point in the image acquired from the image input unit 501 assumes an extreme value, and sets an area having a range based on the obtained scale.

A method for that purpose will be explained in detail below. A scale is obtained first so that a feature amount which is calculated using pixels of an area with a given point as the center, and given as a scalar amount assumes an extreme value in a Gaussian scale space. The feature amount includes, for example, a luminance gradient intensity, the Laplacian output, and various outputs of wavelet filters. The Gaussian scale space is described in Tony Lindeberg, "Edge Detection and Ridge Detection with Automatic Scale Selection, International Journal of Computer Vision, vol. 30, number 2, pp 117-154, 1998. If the extreme value obtained here is larger than a predetermined threshold, the point is determined as a boundary candidate point, and a circular or rectangular area having a size proportional to the scale at the point is determined as a temporary area.

If the extreme value is not larger than the predetermined threshold, and then the point is not determined as a boundary candidate point, that point is not used in subsequent processing. An eigenvalue and eigenvector of a matrix indicating a luminance value and the spread of a gradient within the temporary area are obtained. The matrix includes a covariance matrix of a luminance value and luminance gradient, and a second moment matrix. An elliptic area in which the direction of the eigenvector is determined as an axial direction and a set size proportional to the corresponding eigenvalue is determined as the axial length is set as a reference area. Although the shape of a reference area is an ellipse in this embodiment, an arbitrary shape such as a rectangle or a shape surrounded by a curve represented by parameters may be used.

Figure 5A:
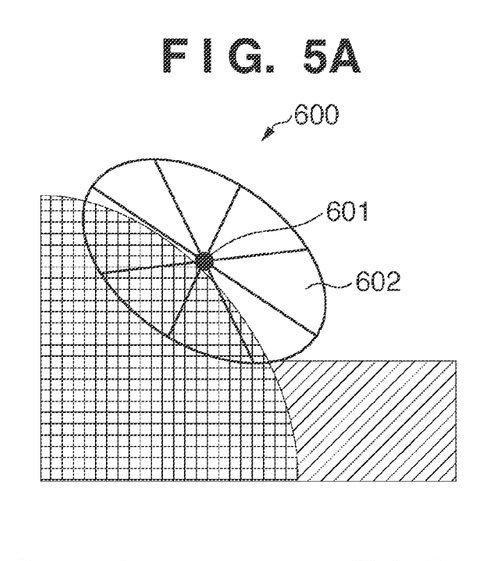
FIGS. 5A and 5B are views showing examples of image processing executed by the image processing apparatus according to the embodiment.

A reference area dividing unit 503 divides the reference area set by the reference area setting unit 502 into a plurality of small areas. A practical example of the dividing processing will be described with reference to FIGS. 5A and 5B. As shown in FIG. 5A, the unit 503 divides a reference area 600 into M sector areas 602 by boundaries radially equiangularly set from a center 601 of the reference area 600. The unit 503 then calculates an image feature amount of each sector area 602. In this embodiment, an image feature is obtained by representing the average value of pixel colors within the area by an L*a*b* color system. Other image features, however, may be used. The unit 503 evaluates the similarity of neighboring sector areas 602 next. Assume that a given sector area 602 is determined as the first area, and its chromaticity is represented by $(L_1, a_1, b_1)$. Assume also that the chromaticity of the second area adjacent to the first area is represented by $(L_2, a_2, b_2)$. In this case, the unit 503 calculates the similarity of the areas according to the following expression. If a calculated value is smaller than a predetermined threshold, the unit 503 determines that the first area and the second area are similar to each other, and then integrates them into one area.

$$\{(L_1-L_2)^2+(a_1-a_2)^2+(b_1-b_2)^2\}^{1/2}$$

The reference area dividing unit 503 integrates similar neighboring areas, among the small areas obtained by dividing the reference area, into one small area, and eventually outputs m (m≤M) small areas.

Figure 5B:
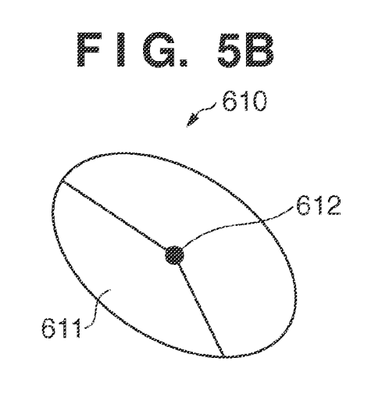

A reference area 610 shown in FIG. 5B indicates a situation after the small areas 602 constituting the reference area 600 are integrated. The reference area 610 is eventually divided into two small areas, that is, small areas 611 and 612.

A small area feature extraction unit 504 calculates an image feature amount within each small area output from the reference area dividing unit 503. The image feature amount here can be determined as the same one calculated by the reference area dividing unit 503. Note that the image feature amount is not limited to color information, but may be calculated by using another image information and then used. Next, a reference area information storage unit 505 stores, in association with each other, information on the position, boundary and scale of the reference area and that on the position and boundary of the ith small area output from the reference area dividing unit 503, and the image features of the small areas output from the small area feature extraction unit 504. Note that i assumes an integer of 1 to m, and m represents the number of small areas constituting a target reference area.

Figure 6A:
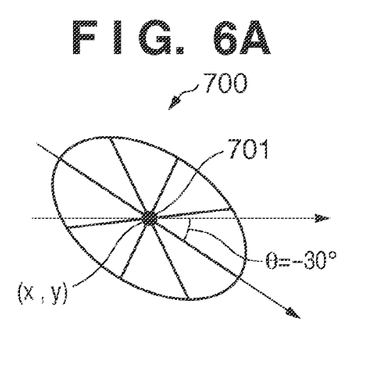
FIGS. 6A to 6C are views for explaining image integration processing performed by the image processing apparatus according to the embodiment.

This will be described in detail with reference to FIGS. 6A to 6C. The position of an reference area is at the coordinates (x, y) of a center 701 of the reference area in FIG. 6A. The boundary of the reference area is represented by the length $l_a$ of the major axis of an ellipse forming the boundary of the reference area, the length $l_b$ of the minor axis of the ellipse, and an angle θ (−90°<θ<90° or θ=90°) between the major axis and the X-axis of the image. In a reference area 700 in FIG. 6A, the angle between the major axis and the X-axis is −30°. The scale information contains an optimum scale parameter σ obtained by the reference area setting unit 502.

Figure 6B:
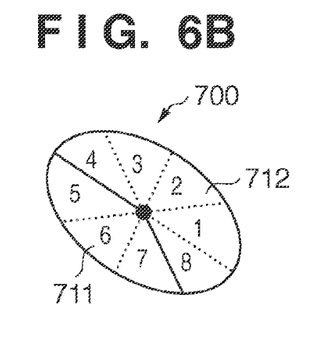

The information on the position and boundary of the ith small area is defined as follows. The information on the boundary of the small area will be explained first. Sectors which are obtained by equally dividing, into m, the central angle generated during the processing in the reference area dividing unit 503 are numbered counterclockwise from the positive direction of the major axis of the ellipse within the reference area 700. In FIG. 6B, the sectors are numbered 1 to 8. Assume that the information on the boundary of a small area contains the numbers $c_1$ and $c_2$ of sectors at two ends of the small area eventually integrated, which are arranged in a counterclockwise order of appearance. For example, in the reference area 700 in FIG. 6B, a small area 711 has sectors 5 and 7 at two ends, and its boundary information is thus (5, 7). A small area 712 has sectors 8 and 4 at two ends, and its boundary information is (8, 4).

Figure 6C:
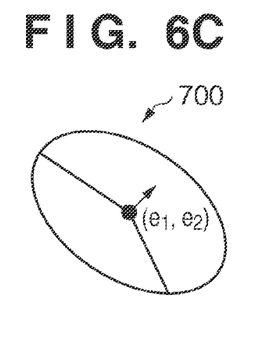

As can be seen in the reference area 700 of FIG. 6C, the position information of the small area is defined as a unit vector $(e_1, e_2)$ pointing in a direction in which the central angle of the small area is divided into two. The numbers $c_1$ and $c_2$ of the sectors at two ends of the ith small area, the position information $(e_1, e_2)$ of the small area, and the average value (L, a, b) of chromaticity values within the small area are combined into one vector $v_i=(c_1, c_2, e_1, e_2, L, a, b)$. At this time, the reference area information storage unit 505 considers $(x, y, l_a, l_b, \theta, \sigma, v_1, v_2, \ldots, v_m)$ as one structure, and stores it as reference area information.

A first reference area setting unit 506 selects the first reference area to be used for comparison among reference areas stored in the reference area information storage unit 505. A first small area setting unit 507 defines the first small area to be used for comparison among small areas belonging to the reference area output from the first reference area setting unit 506. A second reference area setting unit 508 defines the second reference area to be compared with the first reference area. The second reference area is selected based on information on the scale and shape of the first reference area, and that on the position and boundary of the first small area. Among reference areas at boundary candidate points within an area obtained by reducing or enlarging an ellipse of the first reference area at a predetermined ratio, a reference area whose features (the shape and direction) associated with the shape are most similar to those of the first reference area and whose center is closest to the that of the first reference area is selected as the second reference area. Note that it is possible to represent the shape at a ratio of the major axis to the minor axis of a reference area, and to represent the direction as a slope with respect to a predetermined direction of the major or minor axis.

Figure 7:
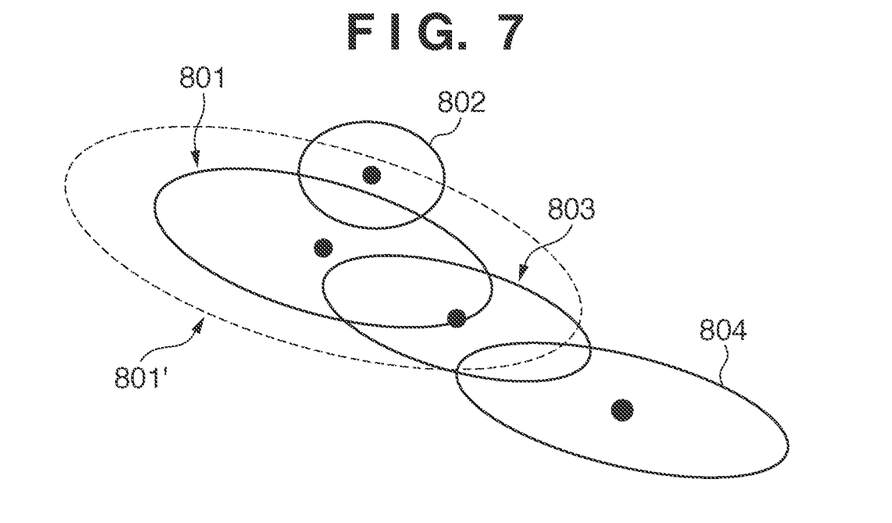
FIG. 7 is a view for explaining how to select the second reference area in the embodiment.

A method of selecting the second reference area will be described in detail with reference to FIG. 7. FIG. 7 shows a case in which there exist a first reference area 801 and reference areas 802, 803, and 804 around it. An area 801' is obtained by enlarging the first reference area 801 at a predetermined ratio. Since the area 801' does not include the center of the reference area 804, the reference area 804 is not selected as the second reference area. The area 801' includes the centers of the reference areas 802 and 803. Since, however, the reference area 803 has a shape and direction more similar to those of the first reference area 801 as compared with the reference area 802, the reference area 803 is selected as the second reference area.

The similarity of the shapes and directions of the reference areas is determined as follows. As for a given reference area $R_i$, among pieces of reference area information in the reference area information storage unit 505, a ratio of the length $l_a$ of the major axis of an ellipse forming the boundary of the reference area to the length $l_b$ of the minor axis of the ellipse is defined by $S_i$. Let $\theta_i$ be an angle, and $\sigma_i$ be a scale. In this case, the similarity of a first reference area Rf and the reference area $R_i$ is evaluated by the following three evaluation inequalities with respect to a ratio $S_f$ of the major axis to the minor axis of an ellipse, an angle $\theta_f$, and a scale $\sigma_f$.

$$|S_i-S_f|<S_{th}, |\theta_i-\theta_f|<\theta_{th}, |\sigma_i-\sigma_f|<\sigma_{th}$$

In this case, $S_{th}$, $\theta_{th}$, and $\sigma_{th}$ represent predetermined thresholds. $\theta_i$ and $\sigma_i$ indicate an angle of the major axis and a scale parameter in the corresponding reference area $R_i$, respectively, and stored in the reference area information storage unit 505. Among a plurality of reference areas which satisfy all the three inequalities, a reference area which has a shortest distance between its center and that of the first reference area is selected as the second reference area.

This makes it possible to perform selection in consideration of surrounding image information such as a global contour shape in selecting the second reference area. This solves the problems of discontinuity of edge points and failure of grouping due to noise, which are associated with the contour tracking method of simply searching for neighboring edge points. In contrast to an existing area-growing method only referring to neighboring pixels, in the present invention, it is possible to reduce the influence of local noise by referring to an image feature amount in a range defined by a scale which optimally characterizes a boundary area.

Based on the information on the scale and shape of the first reference area and that on the position and boundary of the first small area, a second small area setting unit 509 defines the second small area to be compared with the first small area. A small area whose determination result exists in a determination result storage unit 511 is excluded from selection targets.

Figure 8A:
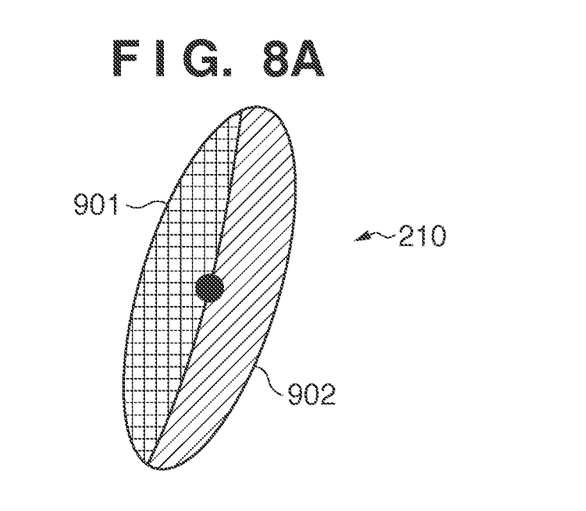
FIGS. 8A and 8B are views for explaining how to select the second small area in the embodiment.
Figure 8B:
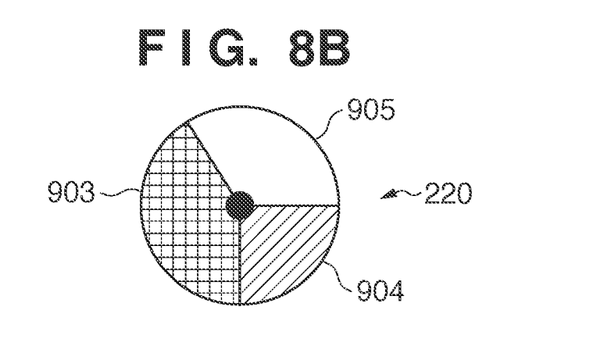

FIGS. 8A and 8B are enlarged views respectively showing the reference areas 210 and 220 in FIG. 1B. The reference area 210 is divided into small areas 901 and 902. The reference area 220 is divided into small areas 903 to 905. Assume that the reference area 210 serves as the first reference area; the small area 901, the first small area; and the reference area 220, the second reference area. In this case, candidates for the second small area are the small areas 903 to 905, and it is possible to select, as the second small area, an area whose inner product is maximum in accordance with the following expression.

$$v_0 \cdot v_i$$

In this case, $v_0$ represents a vector whose start point is the center of the reference area 210 and end point is the geometric centroid of the small area 901, and $v_i$ indicates a vector whose start point is the center of the reference area 220 and end point is the geometric centroid of any of the small areas 903 to 905.

A feature amount comparison unit 510 calculates a similarity using an image feature amount within the small area set by the first small area setting unit 507 and that within the small area set by the second small area setting unit 509. If the calculated similarity is equal to or larger than a predetermined threshold, the small areas compared to each other are determined to belong to the same group. The similarity calculation processing uses the same calculation unit as that utilized in the reference area dividing unit 503. If the feature amount comparison unit 510 determines that the small areas are similar to each other, the determination result storage unit 511 stores, in association with each other, the coordinates of the second reference area and the number of the second small area, and group numbers to which these areas are determined to belong.

According to the information stored in the determination result storage unit 511, a contour extraction unit 512 tracks boundary candidate points in the reference area grouped as a structure to extract the contour of an object in an image.

Constituent parts associated with the image processing apparatus according to the embodiment have been described. Processing executed by the image processing apparatus 100 of the embodiment will be explained next with reference to a flowchart in FIG. 9. Program codes according to the flowchart are stored in a memory such as a RAM or ROM (not shown) within the apparatus of the embodiment, and read out and executed by a CPU (not shown). This allows an information processing apparatus like a personal computer to operate as the image processing apparatus 100 of the embodiment. In steps S1 to S5, features are extracted from an image. In steps S6 to S14, the similarity of feature amounts is used to group boundary candidate points.

Figure 9:
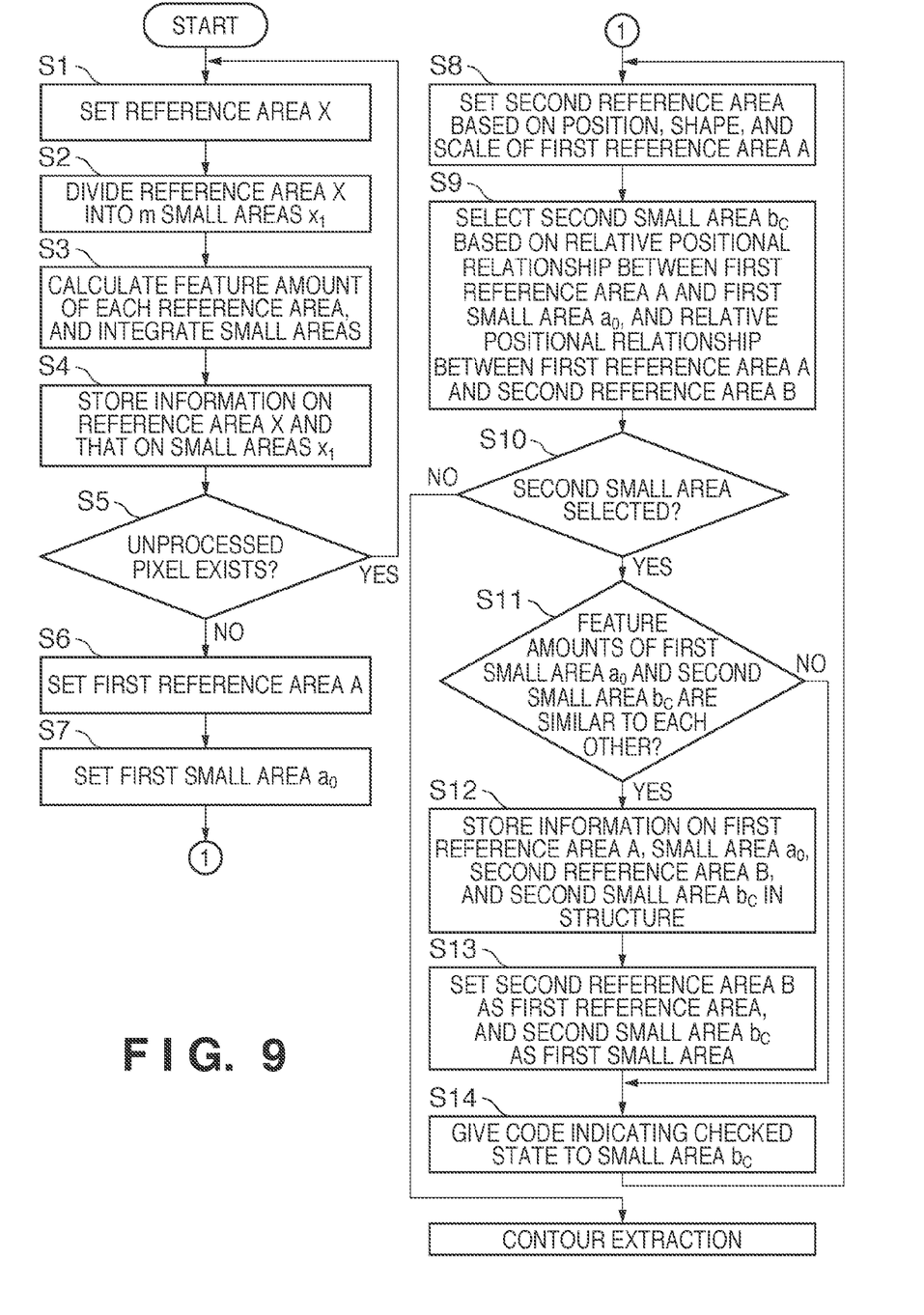
FIG. 9 is a flowchart illustrating processing of the image processing apparatus according to the embodiment.

In step S1, the reference area setting unit 502 sets an elliptic reference area with respect to a pixel P in an image input from the image input unit 501. In step S2, the reference area dividing unit 503 divides the set reference area into m small areas. In step S3, the feature amount of each of the small areas divided in step S2 is extracted. The feature amount here is the average value of pixel colors within the area, which is represented by the L*a*b* color system. The reference area dividing unit 503 integrates neighboring small areas whose similarity of the feature amounts is high.

In step S4, the reference area information storage unit 505 saves reference area information on the reference area set in step S1. The reference area information contains the position and scale of the reference area, the shape and size of the boundary of the reference area, the position and boundary of an integrated small area, and a feature amount within the small area. If, in step S5, there exists any pixel within a frame, which has not undergone the processing in steps S1 to S4, the processing in steps S1 to S4 is executed on the pixel. The processing in steps S1 to S5 completes the feature amount extraction in the image.

In steps S6 to S14, boundary candidate points are grouped based on the similarity of the extracted feature amounts. In step S6, a given reference area A in an image is set as the first reference area. It is possible to select, for the reference area A, a boundary candidate point whose coordinates are smallest (the upper left point of the image) among the boundary candidate points extracted from the image. A method of selecting the first reference area is not limited to this, and it is possible to select a reference area whose area is largest or a boundary candidate point whose coordinates are largest. In step S7, a small area $a_0$ within the first reference area is set as the first small area. For example, it is possible to select, as the small area $a_0$, a small area including an area which has been given the smallest or largest number among small areas which are not given a code indicating a checked state in step S14.

In step S8, based on the information on the shape and direction of the first reference area, a reference area B is set as the second reference area for comparing with the first reference area for their similarity. A method of selecting the second reference area is as described above. In step S9, a small area $b_c$ within the reference area B is set as the second small area. A small area whose inner product of a vector pointing from the center of the first reference area to that of the first small area and a vector pointing from the center of the second reference area to that of a small area $b_i$ within the second reference area is maximum is selected as the second small area $b_c$. A small area which is not given a code indicating a checked state in step S14 is selected as the small area $b_c$. This causes an edge to branch into a plurality of edges like a T-junction. Even if an edge point runs across a plurality of areas, it is possible to correctly select a small area to be compared.

If it is determined in step S10 that it was possible to select a small area satisfying the condition in step S9, the process advances to step S11; otherwise, the process ends. In step S11, the feature amounts of the first and second small areas are compared. If the feature amounts are similar to each other, the process advances to step S12; otherwise, the process advances to step S14. In step S12, pieces of reference area information of the first reference area, first small area, second reference area, and second small area are stored in a storage medium as one structure. That is, information of x, y, $l_a$, $l_b$, $\theta$, and $\sigma$ pertaining to the first and second reference areas, and that of $v_i$ pertaining to the first and second small areas are combined into one structure. As long as it is recognized that the first and second small areas belong to the same group, a method of combining the information into a structure is not specifically limited, and for example, a method of assigning the number of group may be used.

In step S13, the reference area B is newly set as the first reference area, and the small area $b_c$ is newly set as the first small area. In step S14, the small area $b_c$ of the reference area B is given a code indicating a checked state. It is possible to implement this by giving the information $v_i$ of each small area a flag area indicating whether a check is complete or not when the reference area information storage unit 505 manages reference area information. The processing from step S5 is then repeated using the first reference area and reference small area newly set in step S13.

The above processing enables to group small areas with respect to a boundary candidate point, and to extract the contour in FIG. 3 from the input image in FIG. 1A. It is possible to use the present invention as a feature extraction unit for extracting an object of interest from an image or detecting an object. It is, for example, possible to extract and cut out the contour of clothes or face of a person in a complex background.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (for example, computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-204137, filed Sep. 3, 2009, which is hereby incorporated by reference herein in its entirety.

What is claimed is:

1. An image processing apparatus, comprising at least a processor and memory, cooperating to function as:
an obtaining unit configured to obtain an image including an object;
an area setting unit configured to extract a plurality of boundary candidate points from the image, set a plurality of reference areas which include at least one of the plurality of boundary candidate points, divide each reference area into a plurality of small areas, and integrate, among the plurality of small areas within the same reference area, neighboring areas having similar feature amounts;
a first reference area setting unit configured to set a first reference area from the plurality of reference areas;
a first small area setting unit configured to set a first small area from a plurality of small areas included in the first reference area;
a second reference area setting unit configured to set, from the plurality of reference areas, a second reference area which is similar to the first reference area with respect to shape;
a second small area setting unit configured to set a second small area, from a plurality of small areas included in the second reference area;
a determination unit configured to determine whether a feature amount of the first small area and a feature amount of the second small area are similar to each other; and
a contour extraction unit configured to extract a contour of the object based on the determination result of the determination unit.

2. An image processing apparatus, comprising at least a processor and memory, cooperating to function as:
an obtaining unit configured to obtain an image including an object;
an area setting unit configured to extract a plurality of boundary candidate points from the image, and set a plurality of reference areas which include at least one of the plurality of boundary candidate points;
a first reference area setting unit configured to set a first reference area from the plurality of reference areas;
a first small area setting unit configured to set a first small area from a plurality of small areas included in the first reference area;
a second reference area setting unit configured to set, from the plurality of reference areas, a second reference area;
a second small area setting unit configured to set a second small area, from a plurality of small areas included in the second reference area;
a storage unit configured to store, in association with one another, the first reference area, the second reference area, the first small area, and the second small area; and
a contour extraction unit configured to extract a contour of the object based on the information stored by said storage unit,
wherein said second reference area setting unit sets the second reference area from the plurality of reference areas included in an area obtained by enlarging or reducing the first reference area.

3. An image processing apparatus, comprising
at least a processor and memory, cooperating to function as:
an obtaining unit configured to obtain an image including an object;
an area setting unit configured to extract a plurality of boundary candidate points from the image, and set a plurality of reference areas which include at least one of the plurality of boundary candidate points;
a first reference area setting unit configured to set a first reference area from the plurality of reference areas;
a first small area setting unit configured to set a first small area from a plurality of small areas included in the first reference area;
a second reference area setting unit configured to set, from the plurality of reference areas, a second reference area which is similar to the first reference area with respect to shape;
a second small area setting unit configured to set a second small area, from a plurality of small areas included in the second reference area;
a storage unit configured to store, in association with one another, the first reference area, the second reference area, the first small area, and the second small area; and
a contour extraction unit configured to extract a contour of the object based on the information stored by said storage unit, wherein
each reference area is an ellipse whose center is a boundary candidate point, and
each reference area has a shape feature which includes a ratio of a major axis to a minor axis of the ellipse and a slope of the major axis or the minor axis with respect to a predetermined direction.

4. An image processing apparatus, comprising
at least a processor and memory, cooperating to function as:
an obtaining unit configured to obtain an image including an object;

an area setting unit configured to extract a plurality of boundary candidate points from the image, and set a plurality of reference areas which include at least one of the plurality of boundary candidate points;

a first reference area setting unit configured to set a first reference area from the plurality of reference areas;

a first small area setting unit configured to set a first small area from a plurality of small areas included in the first reference area;

a second reference area setting unit configured to set, from the plurality of reference areas, a second reference area which is similar to the first reference area with respect to shape;

a second small area setting unit configured to set a second small area, from a plurality of small areas included in the second reference area;

a storage unit configured to store, in association with one another, the first reference area, the second reference area, the first small area, and the second small area; and a contour extraction unit configured to extract a contour of the object based on the information stored by said storage unit, wherein said second small area setting unit calculates an inner product of a vector connecting a geometric centroid of the first small area and a boundary candidate point in the first reference area, and each vector connecting a geometric centroid of each small area included in the second reference area and a boundary candidate point in the second reference area, and sets, as the second small area, a small area in the second reference area for which a corresponding vector leads to a maximum inner product.

5. The apparatus according to claim 4, wherein each reference area has a feature amount which includes color information of pixels in an area of interest.

6. An image processing method for an image processing apparatus, said method comprising:

an obtaining step of obtaining an image including an object;

an area setting step of extracting a plurality of boundary candidate points from the image, setting a plurality of reference areas which include at least one of the plurality of boundary candidate points, dividing each reference area into a plurality of small areas and integrating, among the plurality of small areas within the same reference area, neighboring areas having similar feature amounts;

a first reference area setting step of setting a first reference area from the plurality of reference areas;

a first small area setting step of setting a first small area from a plurality of small areas included in the first reference area;

a second reference area setting step of setting, from the plurality of reference areas, a second reference area which is similar to the first reference area with respect to shape;

a second small area setting step of setting a second small area from a plurality of small areas included in the second reference area;

a determination step of determining whether a feature amount of the first small area and a feature amount of the second small area are similar to each other; and a contour extraction step of extracting a contour of the object based on the determination result in the determination step.

7. A non-transitory computer-readable storage medium storing an executable program for causing a computer having at least a processor and memory to function as an image processing apparatus comprising:

an obtaining unit configured to obtain an image including an object;

an area setting unit configured to extract a plurality of boundary candidate points from the image, set a plurality of reference areas which include at least one of the plurality of boundary candidate points, divide each reference area into a plurality of small areas and integrate, among the plurality of small areas within the same reference area, neighboring areas having similar feature amounts;

a first reference area setting unit configured to set a first reference area from the plurality of reference areas;

a first small area setting unit configured to set a first small area from a plurality of small areas included in the first reference area;

a second reference area setting unit configured to set, from the plurality of reference areas, a second reference area which is similar to the first reference area with respect to shape;

a second small area setting unit configured to set a second small area from a plurality of small areas included in the second reference area;

a determination unit configured to determine whether a feature amount of the first small area and a feature amount of the second small area are similar to each other; and a contour extraction unit configured to extract a contour of the object based on the determination result of the determination unit.

8. The apparatus according to claim 1, wherein the second small area setting unit sets the second small area which is similar to the first small area with respect to feature amount.

9. The apparatus according to claim 1, further comprising a storage unit configured to store, in association with each other, the first reference area, the second reference area, the first small area, and the second small area.

10. An image processing apparatus, comprising at least a processor and memory, cooperating to function as:

an obtaining unit configured to obtain an image including an object;

a first reference area setting of setting a first reference area from the plurality of reference areas;

a first small area setting step of setting a first small area from a plurality of small areas included in the first reference area;

a second reference area setting step of setting, from the plurality of reference areas, a second reference area which is similar to the first reference area with respect to shape;

a second small area setting step of setting a second small area from a plurality of small areas included in the second reference area;

a determination step of determining whether a feature amount of the first small area and a feature amount of the second small area are similar to each other; and a contour extraction step of extracting a contour of the object based on the determination result of the determination step.

11. An image processing method for an image processing apparatus, said method comprising:

an obtaining step of obtaining an image including an object;

an area setting step of extracting a plurality of boundary candidate points from the image, set a plurality of reference areas which include at least one of the plurality of boundary candidate points;
a first small area setting unit configured to set a first small area from a plurality of small areas included in the first reference area;
a second reference area setting unit configured to set, from the plurality of reference areas, a second reference area which is similar to the first reference area with respect to shape;
a second small area setting unit configured to set a second small area from a plurality of small areas included in the second reference area;
a determination unit configured to determine whether a feature amount of the first small area and a feature amount of the second small area are similar to each other; and
a contour extraction unit configured to extract a contour of the object based on the determination result of the determination unit.

12. A non-transitory computer-readable storage medium storing an executable program for causing a computer having at least a processor and memory to function as an image processing apparatus comprising:
an obtaining unit configured to obtain an image including an object;
an area setting unit configured to extract a plurality of boundary candidate points from the image, set a plurality of reference areas which include at least one of the plurality of boundary candidate points;
a first reference area setting unit configured to set a first reference area from the plurality of reference areas;
an area setting unit configured to extract a plurality of boundary candidate points from the image, set a plurality of reference areas which include at least one of the plurality of boundary candidate points;
a first reference area setting unit configured to set a first reference area from the plurality of reference areas;
a first small area setting unit configured to set a first small area from a plurality of small areas included in the first reference area;
a second reference area setting unit configured to set, from the plurality of reference areas, a second reference area which is similar to the first reference area with respect to shape;
a second small area setting unit configured to set a second small area from a plurality of small areas included in the second reference area;
a determination unit configured to determine whether a feature amount of the first small area and a feature amount of the second small area are similar to each other; and
a contour extraction unit configured to extract a contour of the object based on the determination result of the determination unit.

* * * * *